2 Sheets--Sheet 1.
GEORGE S. ROBERTS.
Improvement in Adjustable Duplex Mirrors.
No. 126,091.            Patented April 23, 1871.
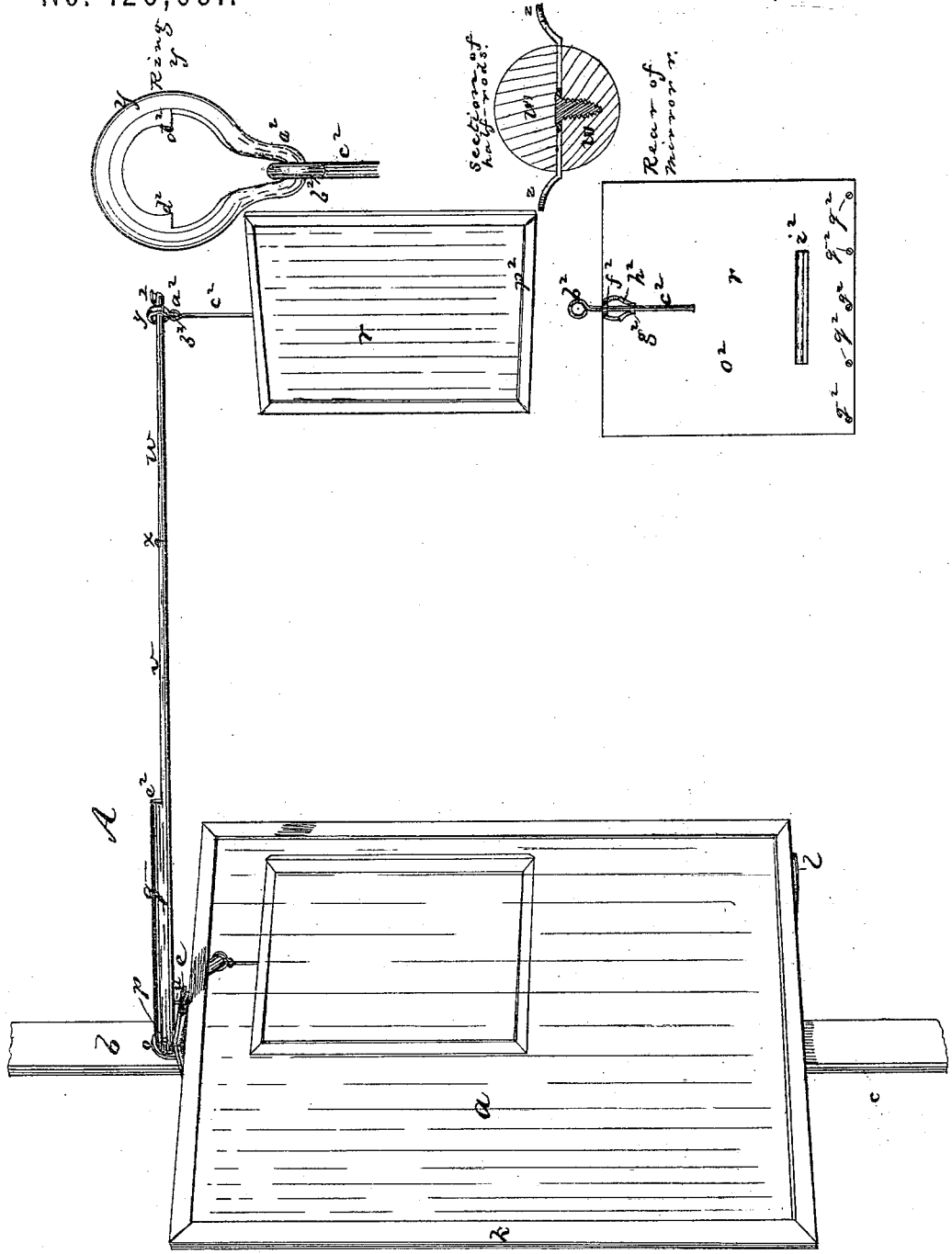
Witnesses.
M. W. Frothingham.
S. B. Kidder.
Inventor:
George S. Roberts.
By his Attys.
Crosby & Gould.

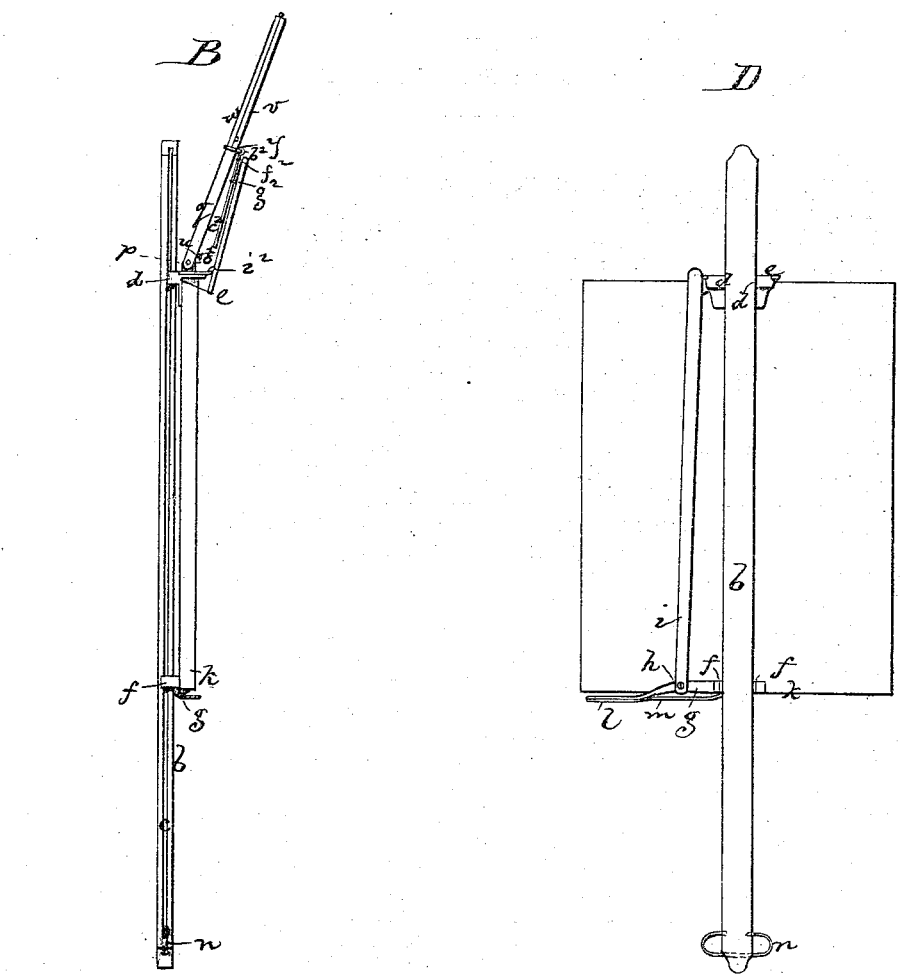

126,091

UNITED STATES PATENT OFFICE.

GEORGE S. ROBERTS, OF MEREDITH VILLAGE, NEW HAMPSHIRE.

IMPROVEMENT IN ADJUSTABLE DUPLEX MIRRORS.

Specification forming part of Letters Patent No. 126,091, dated April 23, 1872.

*To all whom it may concern:*

Be it known that I, GEORGE S. ROBERTS, of Meredith Village, in the county of Belknap and State of New Hampshire, have invented an Improvement in Adjustable Duplex Mirrors; and I do hereby declare that the following, taken in connection with the drawing which accompanies and forms part of this specification, is a description of my invention sufficient to enable those skilled in the art to practice it.

United States Letters Patent No. 115,898, dated June 13, 1871, were granted to me for an improvement in adjustable mirrors, said patent showing a mirror sliding on a vertical bar, which bar is attached to the wall of a room, said mirror having connected to it an auxiliary mirror, which, sliding up and down with the main mirror, is hung at a distance therefrom, is capable of adjustment with respect to such distance, and may be set at any horizontal angle with respect thereto. My present improvements have particular reference to a compound mirror embodying these features, the improvements relating to details of construction, by which manipulation of the mirrors is rendered more easy; a greater steadiness is imparted to them, both when in position to reflect from mirror to mirror, and when placed one above the other; and their safety from breakage is more perfectly insured.

These details will be best understood as the description of the drawing proceeds, the drawing representing a duplex or compound mirror embodying my invention.

A shows the mirrors, arranged to reflect from glass to glass. B is a side elevation, showing the auxiliary mirror mounted upon the main mirror. C shows each mirror in plan. D is a rear view of the main mirror. E is a bottom view, showing the thumb-lever or griper and the spring, by which the main mirror is held in position or released, as occasion may require. $a$ denotes the main mirror; $b$, the bar, to which it is confined, and upon which it slides vertically, the bar being attached to the wall of the room. This bar has cut in each edge a guide-groove or mortise, $c$, and into the opposite grooves extend two runners, $d$, projecting from a plate, $e$, fastened to the top of the mirror, and two similar runners or teeth, $f$, extending from a thumb-lever, $g$, at the bottom of the mirror. This lever is fulcrumed at $h$ to a bar, $i$, connecting the plate $e$ and the lever, the fulcrum-screw $h$ passing through the bar and lever and into the frame $k$. The lever is behind the frame, but its outer end has a thumb-piece, $l$, which extends under the bottom of the frame, where, without extending the hand back of the frame, it is accessible. A wire-spring, $m$, presses down the handle and thereby forces the opposite end up, so that the weight of the mirror and the position of the projections $d$ causes the projections and teeth to gripe the bar and thereby hold the mirror in stationary position, upward pressure of the thumb or fingers upon the lever-handle $l$ loosening the gripe and permitting the glass to be slid down. In the opposite direction the glass may be freely slid as upward pressure upon the frame moves the lever on its fulcrum and loosens the gripe. The wire-spring is cheap, neat, and easily applied. At the bottom of the bar $b$ is a cushioning-spring, $n$, consisting of a plain spring-wire, inserted through a hole bored through the bar in the plane of the grooves, the ends of the wire being bent over and entered into the grooves $c$, said ends being the springs that yield slightly to the weight of the mirror if it accidentally drops, the grooves serving as guides to keep the springs in place while permitting them to freely yield. To the upper plate $e$ is pivoted a fulcrum-plate or post, $o$, which turns horizontally on the plate $e$ as a seat, and to this fulcrum-post is pivoted, by a pin, $p$, the arm $q$, from which is suspended the auxiliary mirror $r$, the arm being so hung as to be capable of swinging up into or nearly into vertical position upon the pivot $p$, and of being swung around horizontally in either direction nearly into the plane of the mirror $a$, the post $o$ turning freely to permit such horizontal movement. To keep the rod stationary into whatever position it may be swung, the plate $e$ has a flat plain surface, $s$, upon which bears the head $t$ of a screw or pin, $u$, which extends from the arm or rod $q$, the contact of this pin and the plate obviating any disposition of the rod to move when set or brought to position. The outer end of the rod is made in two halves, $v$ $w$, hinged together, as seen at $x$, the half $v$ being an integral extension of the main part of the rod. When the mirror $r$ is to be placed in position to reflect to the main mirror, the half $w$ is swung out, and the mirror is then slid out to the end of the rod, the slide-ring $y$, from which the mirror is suspended, bringing up against a stop, $z$, as seen at A. This ring is made of metal, with a loop, $a^2$, to which the hook $b^2$ of a suspending-rod, $c^2$, is hooked, and, with two shoulders, $d^2$, which rest and slide upon the flat tops of one of the two half rods, said shoulders guiding the slide and keeping it steady. When the mirror is not in use, the ring is slid up against the face $e^2$, and the half rod $w$ is thrown over upon the half rod $v$, the ends of the stop $z$ being so bent as to guide the half rod to position, so that it lies evenly upon the top of the half rod $v$. The suspension-rod $c^2$ slides in two ears or bearings, $f^2$ $g^2$, of a plate, $h^2$, fastened to the back of the mirrors, the bearings $f^2$ $g^2$ being at such distances apart that the mirror is kept from swaying upon the rod. The bearing-plate $h^2$ is placed at the extreme upper part of the mirror-back, and upon this back is a cleat, $i^2$, and when the auxiliary mirror is not in use the bearing-plate $h^2$ is slid up to the hook $b^2$, the rod is tipped up to a nearly vertical position, and the cleat $i^2$ is then laid upon the plate $e$, which is made with a straight edge, $k^2$, to support the cleat. This brings the parts to the position shown at B, the auxiliary mirror at the top of the main mirror, and, by placing the bearing-plates at the top of the mirror-back, the mirror is more securely held in position both when suspended from the rod $c^2$ and when mounted upon the main mirror. The bar $i$, that extends from the plate $e$ to the lever-plate $g$, not only affords a very strong bearing for the fulcrum-pin of the lever, but it acts as a strengthener to the mirror-frame, and it also acts as a guard to prevent contact of the back-board of the mirror with the bar $b$. The mirror-back being of light thin stuff, is liable to warp and spring, and if, by such action, it comes into contact with the bar $b$, it will impede the slide movement of the mirror upon said bar. This warping and springing the bar $i$ obviates, insomuch as to prevent contact of the mirror-back and the bar, the inner surface of the bar $i$ lying nearer to the mirror-back than does the inner surface of the bar $b$, and being sufficiently rigid to keep the mirror-back in place.

In my patent No. 115,898 the bearings which slid upon the bar extended across the front face of the bar, and in sliding upon the same marred said face. But in my present construction, nothing touches the front face of the bar, which, being made very smooth, and polished or varnished, will retain its perfect surface, the bearing and griping devices all acting upon the edges of the bar and in the mortises or slots thereof.

The pin $u$, that extends from the rod $q$, and slides upon the plate $e$, is made adjustable, or may be made to project more or less from the rod, so that the inclination of the rod may be thereby adjusted to correct the hanging position of the auxiliary mirror; and, by the use of this pin, contact of the rod with the plate and consequent wear of the rod are prevented.

By careless movement of the auxiliary mirror it may sometimes be broken; and to enable the glass to be readily replaced without the aid of a workman, I make the mirror with a back, $o^2$, permanently fastened to the side bars of the frame, and with a removable bottom bar, $p^2$, secured to the back by screws, $q^2$. If the glass be broken, the screws may be removed, the bottom bar taken out, a new glass slipped in at the bottom of the frame, and the bottom bar then again fastened in place by the screws—a piece of work which an unskilled person may perform almost as readily as a cabinet-maker.

All of these details of construction improve the invention set forth in my patent No. 115,898, and add very materially to the value of the duplex mirror.

I claim—

1. In combination with the mirror $a$, the runner-plates, each made with teeth, and the bar $b$, having the grooves or mortises $c$ in its opposite edges, substantially as shown and described, and for the purpose set forth.

2. I claim the bar $i$, in combination with the bar $b$ and the toothed runner-plates, when applied to a mirror-back, substantially as set forth.

3. In combination with the lower runner-plate, formed as a lever, and with griping-teeth $f$ and handle $l$, lying under the bottom of the mirror, the wire-spring $m$, fastened under the bottom of the frame and bearing upon the lever, the combination being substantially as shown and described.

4. In combination with the mirror $a$ and the connecting device, the bunter-spring $n$, formed of the spring-wire running through the bars $b$, and having its opposite ends bent and sliding in the grooves of the bar, substantially as shown and described.

5. The adjustable pin $u$, extending from the rod $q$, and resting and sliding on the plate $e$, as and for the purpose shown and described.

6. In combination with the rod $q$ $v$ $w$, the metallic slide-ring $y$, made with the loop $a^2$, and also with shoulders $d^2$, substantially as shown and described.

7. In combination with the half rod $w$, the bent stop piece $z$, serving the purpose not only of a stop, but also, by means of its bent and flaring ends, serving to receive, guide, and position the half rod $v$ when the parts $v$ and $w$ are folded together.

8. The combination, with the mirrors $a$ and $r$, of the cleat $i^2$ on the back of mirror $r$, and the straight-edged support-plate $e$ on mirror $a$, substantially as shown and described.

9. The permanent mirror-back $o^2$, and permanent frame-pieces, made with the removable bottom piece $p^2$, substantially as and for the purpose set forth.

GEO. S. ROBERTS.

Witnesses:
 FRANCIS GOULD,
 M. W. FROTHINGHAM.